United States Patent
Marchini et al.

(10) Patent No.: US 8,221,570 B2
(45) Date of Patent: Jul. 17, 2012

(54) PROCESS FOR MANUFACTURING TYRES FOR VEHICLE WHEELS

(75) Inventors: Maurizio Marchini, Milan (IT);
Fiorenzo Mariani, Milan (IT);
Riccardo Azzaretto, Milan (IT);
Stefano Sangiovanni, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 574 days.

(21) Appl. No.: 12/227,798

(22) PCT Filed: May 30, 2006

(86) PCT No.: PCT/IB2006/001413
§ 371 (c)(1),
(2), (4) Date: Oct. 21, 2009

(87) PCT Pub. No.: WO2007/138374
PCT Pub. Date: Dec. 6, 2007

(65) Prior Publication Data
US 2010/0043950 A1     Feb. 25, 2010

(51) Int. Cl.
*B29D 30/30* (2006.01)
*B60C 13/00* (2006.01)
(52) U.S. Cl. ..... 156/133; 156/135; 156/397; 156/406.4; 156/406.6; 152/539; 152/543; 152/555
(58) Field of Classification Search .......... 156/117, 156/121, 123, 124, 130.7, 133, 135, 196, 156/212, 215, 229, 397, 398, 405.1, 406.2, 156/406.4, 406.6, 494; 152/539, 540, 542, 152/543, 548, 552, 555
See application file for complete search history.

(56) References Cited

U.S. PATENT DOCUMENTS

| | | | |
|---|---|---|---|
| 3,251,725 A | 5/1966 | Frazier | |
| 5,935,377 A | 8/1999 | Sergel et al. | |
| 6,024,817 A * | 2/2000 | Miyamoto et al. | 156/130 |
| 6,167,934 B1 | 1/2001 | Debroche | |
| 6,355,126 B1 | 3/2002 | Ogawa | |
| 6,379,493 B1 | 4/2002 | Berning et al. | |
| 2002/0023705 A1 | 2/2002 | Marchini et al. | |
| 2004/0079487 A1 | 4/2004 | Marchini et al. | |
| 2005/0000626 A1* | 1/2005 | Auclair | 156/123 |
| 2005/0077011 A1 | 4/2005 | Pialot | |
| 2005/0269014 A1 | 12/2005 | Mizota | |

FOREIGN PATENT DOCUMENTS

EP     0 956 940 A1     11/1999
(Continued)

*Primary Examiner* — Richard Crispino
*Assistant Examiner* — Martin Rogers
(74) *Attorney, Agent, or Firm* — Finnegan, Henderson, Farabow, Garrett & Dunner, L.L.P.

(57) ABSTRACT

A process and apparatus for manufacturing tires for vehicle wheels, includes building, on a toroidal support, a carcass structure including at least one carcass ply associated, at axially opposite end edges thereof, with annular anchoring structures, the building step of the carcass structure includes forming at least one reinforcing structure, operatively associated with the annular anchoring structures through deposition on the toroidal support of at least one reinforcing element along a predetermined curvilinear deposition path. The deposition of the at least one reinforcing element includes the steps of: cutting to size a piece of at least one reinforcing continuous band-like element fed by a feeding device along a predetermined feeding direction, deforming the piece obtained according to the curvature of a deposition part of the deposition path intended to receive the piece, and depositing the deformed piece at the deposition part.

26 Claims, 4 Drawing Sheets

FOREIGN PATENT DOCUMENTS

| | | |
|---|---|---|
| EP | 1 595 693 A1 | 11/2005 |
| EP | 1 418 043 B1 | 10/2007 |
| GB | 2 327 397 A | 1/1999 |
| JP | 2006-205769 * | 8/2006 |
| WO | WO 01/36185 A1 | 5/2001 |
| WO | WO 2004/091939 * | 10/2004 |

* cited by examiner

PROCESS FOR MANUFACTURING TYRES FOR VEHICLE WHEELS

CROSS REFERENCE TO RELATED APPLICATION

This application is a national phase application based on PCT/IB2006/001413, filed May 30, 2006.

BACKGROUND OF THE INVENTION

1. Field of the Invention

The present invention relates to a process for manufacturing tyres for vehicle wheels.

The invention also relates to an apparatus for the deposition of at least one reinforcing element on a toroidal support, said apparatus being able to be used to carry out the aforementioned process.

2. Description of the Related Art

In the present description and in the subsequent claims, the term "reinforcing element" is used to indicate an element comprising one or more thread-like reinforcing elements, such as textile or metallic cords, incorporated in, or coated with, a layer of elastomeric material.

It should also be specified that, in the present description and in the subsequent claims, the term: elastomeric material, is used to indicate a composition comprising at least one elastomeric polymer and at least one reinforcing filler. Preferably, such a composition also comprises additives like, for example, a cross-linking agent and/or a plasticiser. Thanks to the provision of the cross-linking agent, such a material can be cross-linked through heating, so as to form the final product.

A tyre for vehicle wheels generally comprises a carcass structure comprising at least one carcass ply formed from reinforcing cords incorporated in an elastomeric matrix. The carcass ply has end edges respectively engaged with annular anchoring structures, arranged in the areas usually identified with the name "beads" and normally each formed from a substantially circumferential annular insert on which at least one filling insert is applied, in a radially outer position thereof. Such annular structures are commonly referred to as "bead cores" and have the task of keeping the tyre well fixed to the anchoring seat specifically provided in the rim of the wheel, thus avoiding in operation the radially inner end edge of the tyre coming out from such a seat.

At the beads specific reinforcing structures can be provided having the function of improving the torque transmission to the tyre. The region of the beads, indeed, is particularly active in the transmission of torque from the rim to the tyre when accelerating and when braking and, therefore, the provision of appropriate reinforcing structures in such an area ensures that the torque transmission occurs with the maximum possible reactivity.

In a radially outer position with respect to the carcass ply a belt structure comprising one or more belt layers is associated, said belt layers being arranged radially one on top of the other and having textile or metallic reinforcement cords with crossed orientation and/or with an orientation substantially parallel to the direction of circumferential extension of the tyre.

Between the carcass structure and the belt structure a layer of elastomeric material can be provided, known as "under-belt", having the function of making the radially outer surface of the carcass structure as uniform as possible for the subsequent application of the belt structure.

In a radially outer position with respect to the belt structure a tread band is applied, also made from elastomeric material like other structural elements making up the tyre.

Between the tread band and the belt structure a so-called "under-layer" of elastomeric material can be arranged, said layer having properties suitable to ensure a steady union of the tread band itself.

On the side surfaces of the carcass structure, respective sidewalls of elastomeric material are also applied, each extending from one of the side edges of the tread band up to the respective annular anchoring structure to the beads.

Conventional manufacturing processes of tyres for vehicle wheels essentially provide for the components of the tyre listed above to be firstly made separately from each other, to then be assembled in a subsequent building step of the tyre.

Nevertheless the current tendency is that of using manufacturing processes that allow the production and storage of semi-finished products to be minimised, or possibly, eliminated.

More specifically, attention has now turned towards process solutions that allow the individual components of the tyre to be made by directly applying them, according to a predetermined sequence, onto the tyre being built on a forming support, typically toroidal or cylindrical.

For example, in document WO 01/36185 to the same Applicant, the components of the tyre are made on a toroidal support by sequentially depositing a plurality of reinforcing elements thereon, the reinforcing elements consisting for example of individual rubberised cords or of rubberised cords grouped in parallel in the form of strip-like elements, particularly used in making the carcass and belt structure, and of continuous elongated elements in elastomeric material, particularly used for making the other structural components of the tyre, such as for example tread band, sidewalls, liners, fillers.

Document U.S. Pat. No. 6,355,126 describes for example a method and an apparatus for making a belt layer through deposition on a suitably positioned forming support of band-like pieces cut from a continuous band-like element. The band-like pieces, once cut from the continuous band-like element, are picked up through gripping means and moved to the forming support for deposition.

In EP 1 418 043 A2 a method and an apparatus for forming an annular elastomeric component of a tyre, in particular an insert for filling the beads, are described. The described method comprises an annular extrusion step of elastomeric material on a forming support and a modelling step, through the action of a modelling extruder on the surface of the forming support, of the material deposited to obtain the desired profile for the component.

In U.S. Pat. No. 6,379,493 B1 a device for the transportation and deposition onto a forming support of a tyre of pieces cut to size of elastomeric material is described, said pieces being in particular intended to form inserts for filling the beads. The device comprises rotatable gripping devices which are movable along a direction essentially tangential to the circumferential surface of the forming drum and which allow each piece to be gripped and deposited in a predetermined position on the forming drum.

With particular reference to the region of the tyre defined at the bead, the Applicant has realised the importance of providing in this region a reinforcing structure, as described with reference to the tyre structure discussed above.

In conventional processes, the reinforcing structure intended to be applied in the region of the bead of the tyre consists of one or more semi-finished products made in the form of reinforced continuous band-like elements. Such band-like elements are made separately from the rest of the components of the tyre and then assembled on the tyre in the building step of the tyre. These band-like elements, in particular, are associated with the tyre in the building step in a side-by-side relationship.

The Applicant has considered the problem of making and applying, on a substantially toroidal forming support, a reinforcing structure comprising one or more reinforcing layers, each of which comprising a plurality of reinforcing elements orientated in a non-circumferential direction, for example in a substantially radial direction, in the region of the bead of the tyre in a process for producing tyres for example of the type described in document WO 01/36185 mentioned previously.

The Applicant has verified the possibility of forming on a substantially toroidal forming support a reinforcing structure as described above by applying at least one reinforcing element along a predetermined curvilinear deposition path, said deposition path being defined for example at the region of the bead on a not perfectly planar surface of the forming support.

SUMMARY OF THE INVENTION

The Applicant has also verified the possibility of carrying out the aforementioned application while maintaining the maximum possible flexibility in terms of diameter, thickness and inclination of the reinforcing elements, avoiding the formation of possible defects on the tyre, like for example overlapping or undesired spaces between contiguous portions of such reinforcing elements, so as to ensure a deposition according to the design and thus to ensure increasingly high quality and performance levels of the tyre.

The Applicant has found that by depositing, in sequence and in a side-by-side relationship on a toroidal forming support of a tyre a plurality of pieces cut to size from a continuous reinforcing band-like element, along a predetermined deposition path defined at the region of the bead, wherein each of such pieces is deformed before being deposited according to the curvature of the respective deposition part intended to receive it, it is possible to obtain a tyre built substantially without defects in the region of the bead even with complex design geometries of the tyre itself.

The present invention therefore relates, in a first aspect thereof, to a process for manufacturing tyres for vehicle wheels, comprising building on a toroidal support a carcass structure comprising at least one carcass ply associated, at axially opposite end edges thereof, with annular anchoring structures;

wherein the step of building said carcass structure comprises forming at least one reinforcing structure, operatively associated with said annular anchoring structures through deposition on said toroidal support of at least one reinforcing element along a predetermined curvilinear deposition path;

wherein the deposition step of said at least one reinforcing element comprises the steps of:

cutting to size a piece of at least one continuous reinforcing band-like element;

deforming the piece according to the curvature of a deposition part of the deposition path intended to receive the piece;

depositing the deformed piece at the deposition part;

repeating the cutting, deformation and deposition steps for a predetermined number of times, each time changing the deposition part so as to deposit a plurality of pieces in a side-by-side relationship along the deposition path.

Advantageously, the process of the present invention allows, in a process for manufacturing tyres for example of the type described in document WO 01/36185, a reinforcing structure to be made that is substantially homogeneous and uniform at the region of the bead of the tyre. The homogeneity and uniformity of the reinforcing structure is achieved through a sequential deposition in a side-by-side relationship of pieces of a continuous reinforcing band-like element previously deformed according to the curvature of the part of the curvilinear deposition path defined on the surface of the toroidal support and intended to receive from time to time the deformed piece. Such a deformation ensures that the pieces can be positioned side-by-side along the predetermined deposition path without creating overlapping or undesired intermediate spaces. This occurs irrespective of the diameter, the thickness and the inclination of the pieces.

It is thus possible to make on a toroidal forming support a reinforced tyre at the region of the bead having high quality levels and, consequently, high performance.

Preferably, in the cutting to size step the continuous reinforcing band-like element is fed by a feeding device along a predetermined feeding direction.

Preferably, in the deformation step the piece is deformed substantially in the plane on which it lies.

In a preferred embodiment of the process of the invention, the deformation step comprises the steps of:

gripping the piece at two opposite sides thereof;

rotating at least one side of the piece by a predetermined angle of rotation away from the other side about a respective pin axis.

Advantageously, this way of deformation allows the piece to be given the same curvature as the deposition part on which the piece is intended to be deposited, with high flexibility and through conventional mechanical rotation movements.

Preferably, the aforementioned opposite sides of the piece are parallel to the feeding direction of the continuous reinforcing band-like element.

Preferably, the gripping step is carried out in such a way that said pin axis is arranged at an end area of said at least one side.

Preferably, the end area of said at least one side is intended to be deposited at a radially inner end area of the deposition part.

The extent of the angle of rotation is preferably between about 1° and about 10°.

In a preferred embodiment of the process of the invention the rotation step comprises the step of:

rotating both opposite sides of the piece by respective predetermined angles of rotation away from each other about respective pin axes.

Also in this case, the gripping step is preferably carried out in such a way that the pin axes are arranged at respective end areas of said opposite sides.

Preferably, such end areas are intended to be deposited at respective radially inner end areas of the deposition part.

Preferably, the aforementioned respective angles of rotation are equal to each other.

The extent of such angles of rotation is preferably between about 1° and about 10°.

In a preferred embodiment of the process of the invention, the deposition path extends along an annular portion of the toroidal support, said portion being substantially circular with centre lying on a rotation axis of the toroidal support, and the piece is deformed according to a radius of the aforementioned annular portion.

Preferably, the aforementioned annular portion has an inner radius of between about 200 mm and about 350 mm.

In a preferred embodiment of the process of the invention, the deposition step of the at least one reinforcing structure also comprises the step of:

moving the piece between a first position at the feeding device and a second position at the toroidal support.

Preferably, in this case, the deformation step of the piece is carried out during the moving step. The execution of the deformation step during the moving step advantageously allows the overall time taken to carry out the deposition process to be reduced.

Preferably, the cutting, deformation and deposition steps are repeated for a number of times at least sufficient to cover substantially the entire deposition path through a plurality of said pieces.

In a preferred embodiment, the process of the invention further comprises the step of:

passing a pressing member on one or more of said deposited pieces.

Advantageously, this further step ensures that the pieces deposited stick perfectly and along their entire surface to the underlying structures of the tyre being processed.

Preferably, the at least one continuous reinforcing band-like element has a width of between about 10 mm and about 50 mm.

Preferably, the at least one continuous reinforcing band-like element comprises at least one thread-like reinforcing element incorporated in an elastomeric material.

Preferably, in the cutting step the piece is cut according to a cutting angle of between about 0° and about 70°.

More preferably the cutting angle is between about 20° and about 65°.

Preferably, in the deposition step the piece is deposited at the deposition part along a direction forming a predetermined deposition angle defined between a radial direction of the toroidal support passing, at the moment of deposition, through a radially inner point of the piece and belonging to a direction of longitudinal extension of the piece, and the same direction of longitudinal extension.

Preferably, the deposition angle is between about 0° and about 35°.

Preferably, in the deformation step the deformation of the piece is carried out according to said deposition angle.

Preferably, in the deformation step the deformation of the piece is carried out according to said cutting angle.

Preferably, each reinforcing element comprises at least one thread-like reinforcing element orientated at the end of said deposition step so as to form an angle, with the radial direction passing through the radially inner end thereof, having a width greater than or equal to 0° and lower than 90°.

In a second aspect thereof, the present invention relates to an apparatus for the deposition on a toroidal support of at least one reinforcing element of a tyre for vehicle wheels, comprising:

a feeding device of a continuous reinforcing band-like element;

a cutting device for cutting to size a piece of the continuous reinforcing band-like element;

a gripping device for gripping the piece and depositing it on the toroidal support at a deposition part of a predetermined curvilinear deposition path;

wherein the gripping device comprises a device for deforming the piece according to the curvature of the deposition part.

Such an apparatus can advantageously be used to carry out the process of the present invention described above.

Preferably, the feeding device feeds the continuous band-like element along a predetermined feeding direction.

Preferably, the gripping device comprises at least two gripping elements, at least one of which is rotatable in a plane coinciding with or substantially parallel to a gripping plane about a respective pin axis substantially perpendicular to such a gripping plane.

In the present description and in the subsequent claims, the term "gripping plane" is used to indicate the plane on which the piece lies at the moment when it is gripped by the gripping device.

Through such rotatable gripping elements it is advantageously possible to obtain the deformation of the piece as outlined above with reference to the process of the invention in a simple way and with high flexibility.

Preferably, the at least two gripping elements are both rotatable about respective pin axes substantially perpendicular to the gripping plane.

Preferably, each of the at least two gripping elements comprises a plurality of needles adapted to penetrate into a respective portion of said piece.

Preferably, such needles are aligned along a longitudinal direction of the at least two gripping elements.

Advantageously, such needles allow a secure gripping to be achieved even on small surfaces, as the edges of the piece could be at the gripping sides.

Preferably, the needles of said plurality of needles are individually movable in respective housing seats defined in the at least two gripping elements.

Preferably, each of such housing seats comprises a pneumatic cylinder adapted to control the movement of the movable needle in the respective housing seat. More preferably, such pneumatic cylinders are in fluid communication with each other.

Advantageously, the independent stroke of each needle allows, in the deposition step, a perfect sticking of the gripping sides of the piece to the respective deposition part to be ensured, even when it has a surface that is not flat, like in the case of deposition on toroidal drums at the region of the beads. More specifically, each pneumatic cylinder associated with the corresponding needle, thanks to its sliding on the needle itself, allows the detachment of the individual reinforcing element to be counteracted at the end of the deposition when the needles lift up after the positioning of the reinforcing element. Should the friction between needles and reinforcing element indeed be greater than the sticking action of the reinforcing element on the drum, without the aforementioned pneumatic cylinders, the reinforcing element would remain fixed to the needles.

In a preferred embodiment of the apparatus of the invention, the at least two elements comprise respective skids capable of sliding longitudinally with respect to a fixed body of the gripping device. More preferably, such skids are capable of sliding independently from each other.

The provision of sliding skids advantageously allows the mutual longitudinal position of the gripping elements to be adjusted, so as to ensure optimal gripping even when the gripping sides of the piece are staggered apart in the feeding direction due to the fact that the piece is cut from the continuous reinforcing band-like element with a cutting angle different to 90° with respect to such a feeding direction.

Preferably, the gripping device is movable with respect to the feeding device and to the cutting device along two translation directions substantially perpendicular to each other.

Preferably, the gripping device is movable from a first position near to the cutting device to a second position near to the toroidal support.

In a preferred embodiment of the apparatus of the present invention, the gripping device comprises a permanent magnet positioned between the at least two gripping elements and facing the gripping plane of the piece.

Advantageously, such a permanent magnet can contribute to the gripping of the piece in the case in which the latter comprises thread-like reinforcing elements made of steel.

Preferably, the apparatus of the invention further comprises a pressing member adapted to exert a pressure on the piece deposited on the toroidal support.

BRIEF DESCRIPTION OF THE DRAWINGS

Further characteristics and advantages of the present invention shall become clearer from the following detailed description of a preferred embodiment of an apparatus and of a process in accordance with the present invention, made with reference to the attached drawings. In such drawings.

DETAILED DESCRIPTION OF THE INVENTION

Figure 3:
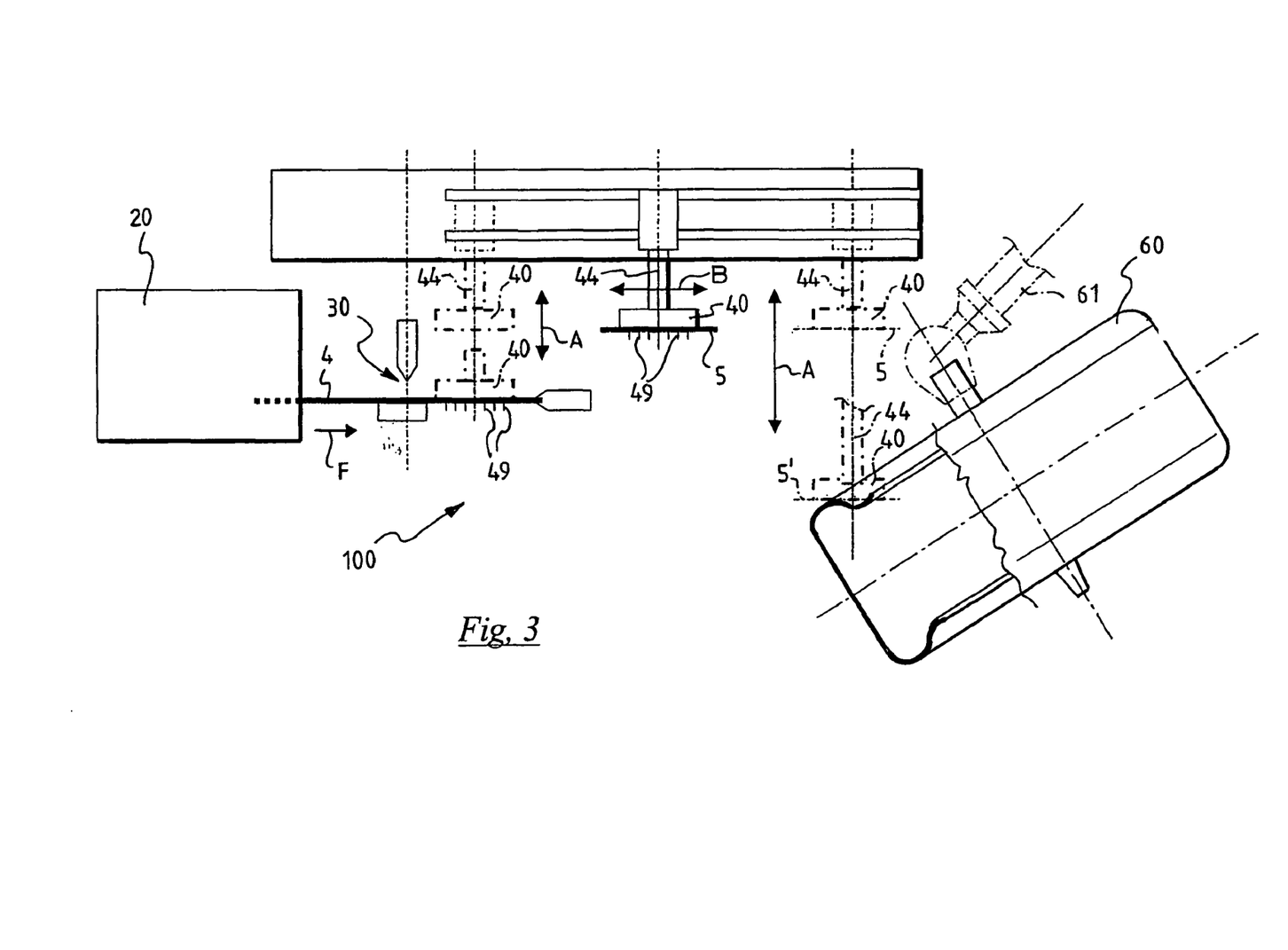
FIG. 3 is a schematic side view of an apparatus for the deposition of reinforcing elements in accordance with the invention.

In FIG. 3, an example of an embodiment of an apparatus for the deposition of reinforcing elements of vehicle tyres in accordance with the present invention is wholly indicated with reference numeral 100.

The apparatus 100 is part of a work station of the type described in document WO 01/36185 to the same Applicant.

Figure 2:
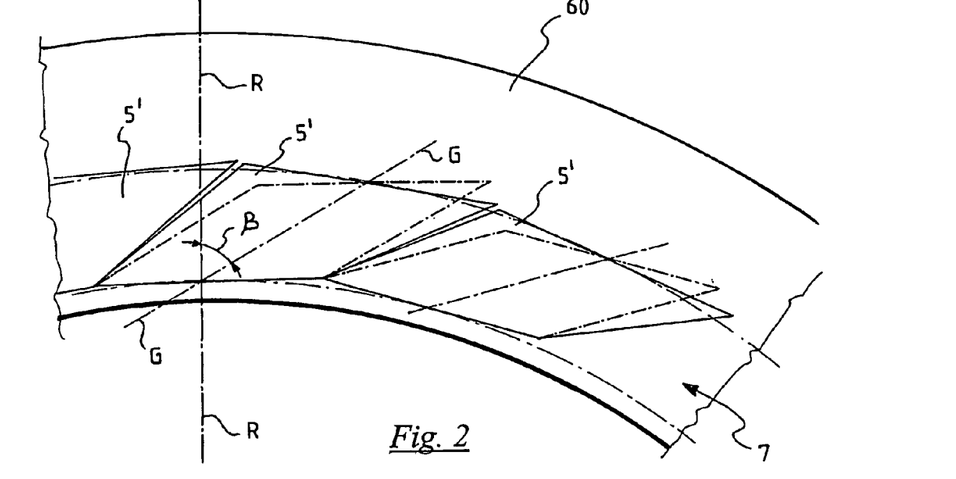
FIG. 2 is a side view that schematically illustrates the pieces of FIG. 1 deposited on corresponding deposition parts of a deposition path defined on a toroidal support.
Figure 2A:
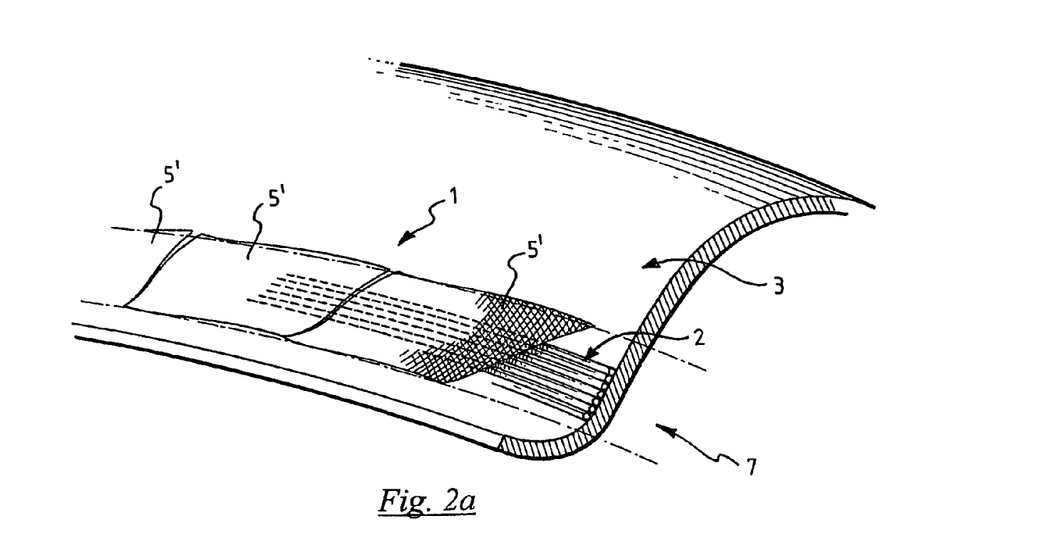
FIG. 2a is a perspective view that schematically shows the pieces of FIG. 1 deposited through the process in accordance with the invention on a portion of the region of the bead of a tyre.

In the described example of embodiment, the apparatus 100 is adapted to make a reinforcing structure, operatively associated with annular anchoring structures 2 of a carcass structure 3 in the region of the bead of a tyre (FIG. 2a). The reinforcing structure comprises at least one reinforcing layer 1 formed from one or more reinforcing elements 5' deposited as described hereafter. The specific axial position of each reinforcing layer 1 with respect to the annular anchoring structures 2 can vary according to the requirements of the product; in particular, the reinforcing structure can comprise a single reinforcing layer 1 made directly on the carcass structure 3, or else between two layers of annular anchoring structures 2, or else in an axially outer position with respect to the annular anchoring structures 2. It is also possible to provide a reinforcing structure comprising many reinforcing layers 1 operatively associated, in different axial positions, with the annular anchoring structures 2.

The manufacture of the reinforcing structure, of the annular anchoring structures 2, of the carcass structure 3, as well as of the other components of the tyre, is advantageously carried out on a toroidal support 60, having an outer surface configured substantially according to the inner configuration of the tyre to be made. The toroidal support 60, not described in detail here since it can be made in any convenient way by the man skilled in the art, is preferably supported by an anthropomorphous robotised arm 61 (only partially visible in FIG. 3), for example of the type described in the aforementioned document WO 01/36185 to the same Applicant.

Each reinforcing element 5' is formed from a piece 5 of predetermined length obtained through cutting operations carried out in sequence on at least one continuous reinforcing band-like element 4 and then suitably deposited along a predetermined deposition path 7 defined on the toroidal support 60 (FIGS. 2 and 2a), as shall be described in detail hereafter, with reference to a preferred embodiment of the process of the invention.

Figure 1:
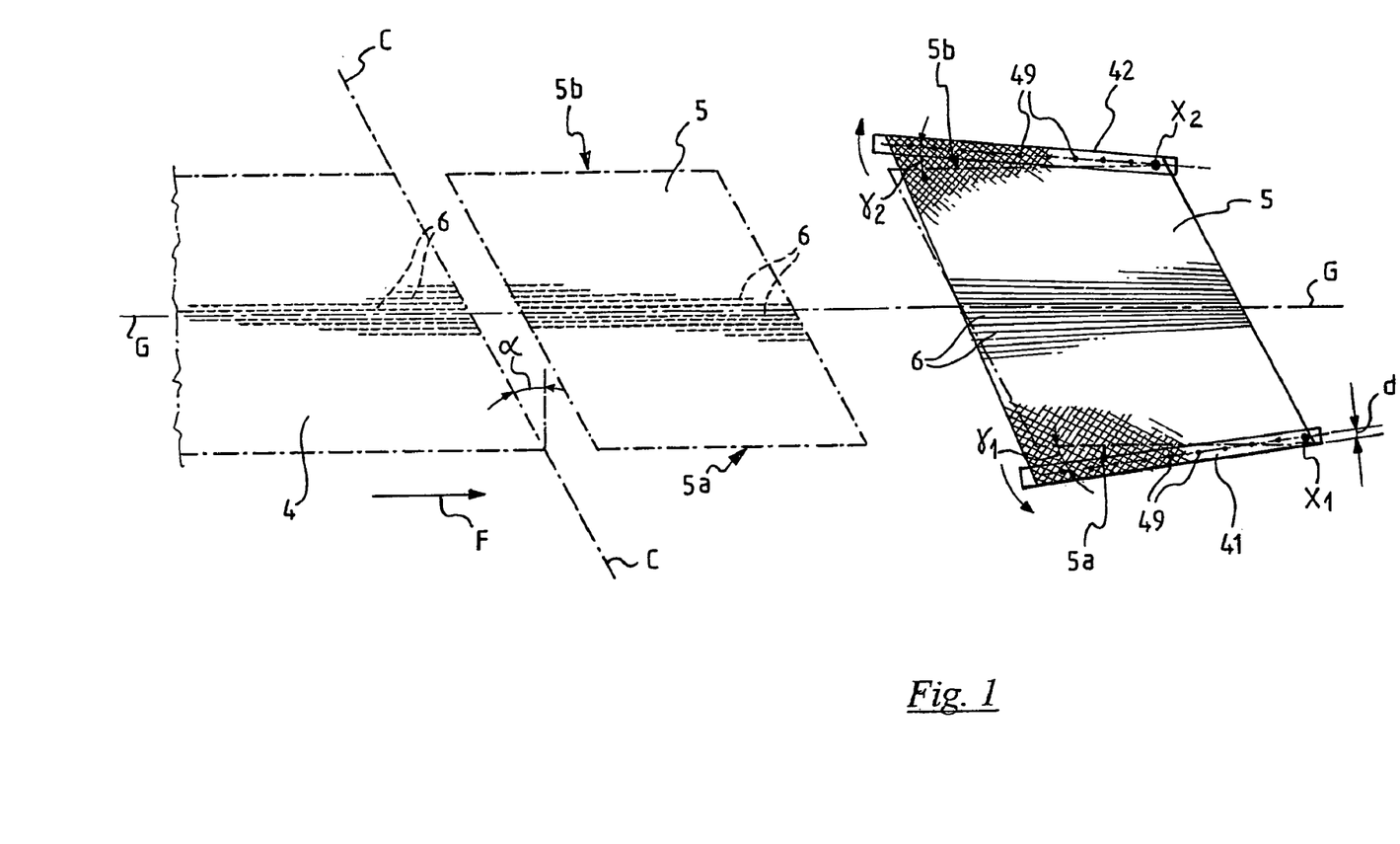
FIG. 1 is a view from above that schematically illustrates the cutting to size and deformation steps of pieces of a continuous reinforcing band-like element in accordance with the process of the present invention.

The continuous band-like element 4 and, consequently, the pieces 5 obtained from it, preferably each comprise a plurality of thread-like reinforcing elements 6 (shown only in FIG. 1 for the sake of clarity) made from metallic material or textile incorporated in a matrix of elastomeric material. Such thread-like reinforcing elements 6 extend parallel to each other, along a direction of longitudinal extension G of the continuous band-like element 4 and of the pieces 5 (FIG. 1). Throughout the present description and in the subsequent claims "direction of longitudinal extension" of the continuous band-like element 4—and, consequently, of the pieces 5—is defined as the line defining the longitudinal direction of the continuous band-like element 4 and passing through the middle point of an end side thereof.

The width of the continuous band-like element 4 is preferably between about 10 mm and about 50 mm, wherein about 25 mm is a particularly preferred operative value.

As schematically represented in FIG. 3, the apparatus 100 comprises a feeding device 20 of the continuous band-like element 4, for example a drawing and/or calandering device or else a feed reel, a cutting device 30 adapted to carry out cutting to size operations on the continuous band-like element 4 to make the pieces 5, and a gripping device 40 to grip the pieces 5 and deposit them on the toroidal support 60.

In accordance with the invention, the gripping device 40, in addition to grip and deposit the pieces 5, is adapted to deform such pieces 5 to adapt them to respective deposition parts of the deposition path 7.

Figure 4:
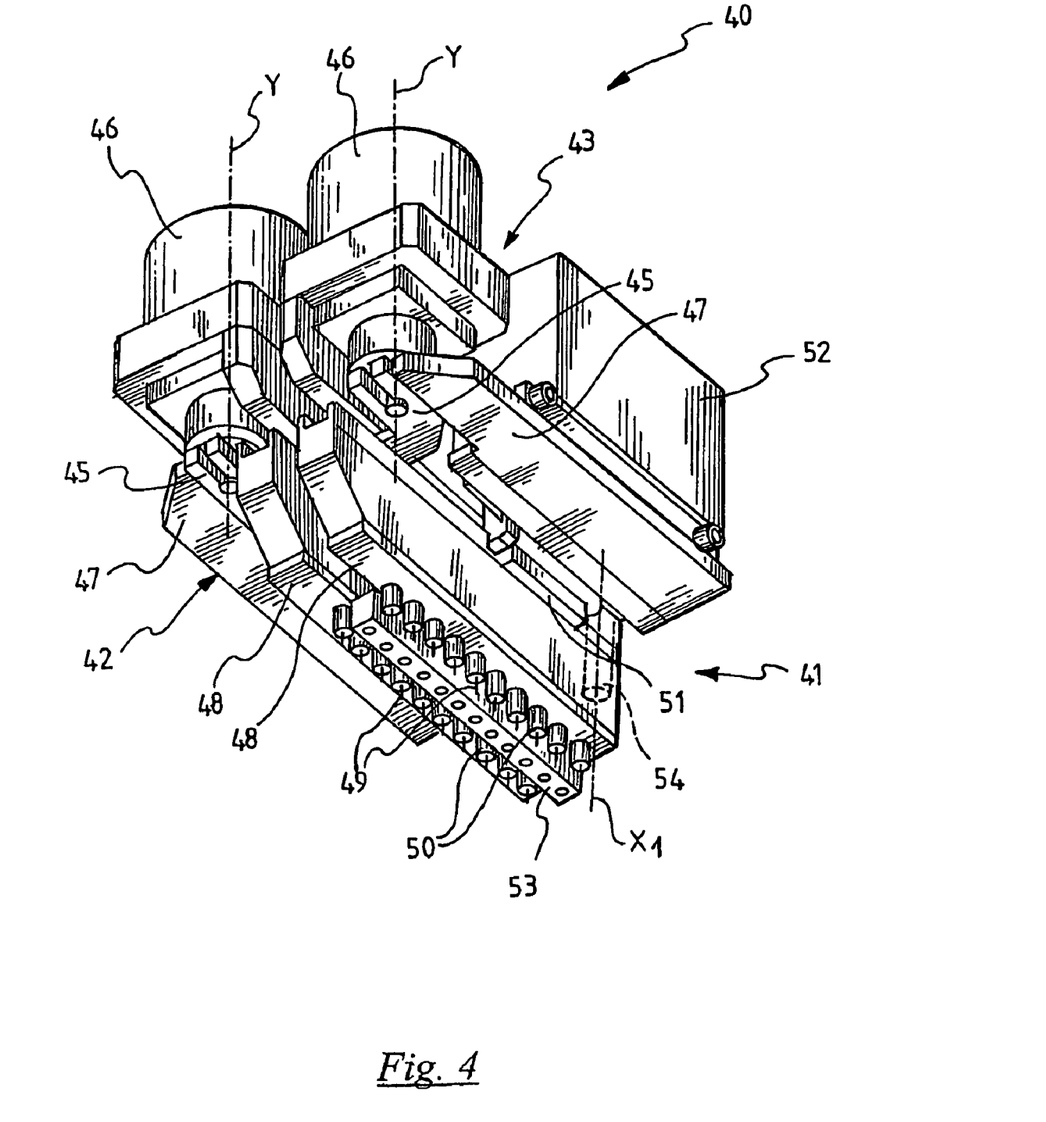
FIG. 4 is a schematic perspective view of a gripping device of the apparatus of FIG. 3.

As can be seen in particular in FIG. 4, the gripping device 40 preferably comprises two gripping elements 41 and 42 rotatably associated with a fixed body 43 which in turn is connected to a moving arm 44 (FIG. 3) of the gripping device 40.

The gripping elements 41, 42, identical to each other, can rotate in a plane coinciding with or substantially parallel to a gripping plane Π of the piece 5, about respective pin axes $X_1$ and $X_2$ (of which only $X_1$ can be seen in the perspective view of FIG. 4) substantially perpendicular to the gripping plane Π. The pin axes $X_1$ and $X_2$ are defined by corresponding connection pins (only one of which, indicated with reference numeral 54, is shown in FIG. 3) between the fixed body 43 and the gripping elements 41, 42.

The rotation of the gripping elements 41, 42 is carried out through the rotation about respective rotation axes Y of suitably shaped rotatable arms 45, actuated through conventional actuators 46. Both the actuators 46 and the rotatable arms 45 are firmly connected with the fixed body 43 of the gripping device 40. Through their rotation, the rotatable arms 45 thrust corresponding abutment elements 47 firmly connected with the gripping elements 41, 42, thus determining their rotation about the respective pin axes $X_1$, $X_2$ with respect to the fixed body 43.

Each of the gripping elements 41, 42, as well as the abutment element 47, comprises a skid 48 carrying, at a face thereof facing towards the gripping plane Π, a plurality of needles 49 adapted to penetrate into portions of the piece 5 to obtain the gripping thereof. The needles 49 are arranged aligned along a longitudinal direction of the skid 48. The needles 49 are operatively associated with respective small pneumatic cylinders 50 capable of independently controlling the vertical movement of each needle. In particular, each small pneumatic cylinder 50, in addition to move the respective needle 49, can slide with respect to it, thus allowing the possible detachment of the reinforcing element 5' to be counteracted at the end of the deposition, when the needles 49 lift up. The small pneumatic cylinders 50 in each skid 48 are preferably in fluid communication with each other, so as to be subjected to substantially the same pressure by an appropriate pressurised fluid.

The skids 48 are associated with respective sliding guides 51 (only one of which can be seen in the perspective view of FIG. 4) that allow the longitudinal sliding thereof, independently from each other, with respect to the fixed body 43. An adjustment unit 52 firmly connected with the fixed body 43 allows the longitudinal position of each skid 48 to be adjusted with respect to the fixed body 43. In particular, it allows a longitudinal staggering of the skids 48 to be set according to the longitudinal staggering of the gripping sides of the piece 5 due to the fact that the piece 5 is obtained by cutting the continuous band-like element 4 with a cutting angle different from 90° with respect to a feeding direction of the continuous band-like element 4.

The gripping device 40 preferably also comprises a permanent magnet 53 firmly connected with the fixed body 43 and arranged facing towards the gripping plane Π between the two gripping elements 41, 42. Such a permanent magnet 53 contributes in particular to the gripping of the piece 5 when it comprises thread-like reinforcing elements 6 made of steel.

By means of the moving arm 44, the gripping device 40 as a whole can be moved between a first position near to the cutting device 30, in which the gripping of the pieces 5 takes place, and a second position near to the toroidal support 60, in which the deposition of the pieces 5 takes place. The gripping device 40 can be moved between these two positions according to two directions of translation substantially perpendicular to each other, indicated in FIG. 3 through the double arrows A and B.

The deposition apparatus 100 preferably also comprises a pressing member (not shown in the figures) of the conventional type and known to the man skilled in the art, which can act upon the deposited pieces 5 so as to ensure that they completely stick to the underlying structures of the tyre being processed. Such a pressing member can be firmly connected with the gripping device 40 and act upon each piece 5 individually, immediately after the deposition thereof, or else it can be independent from the gripping device 40 and act upon the reinforcing layer 1 once the deposition thereof has ended.

With reference to FIGS. 1, 2, 2a and 3 a preferred embodiment of the deposition process of the invention that can be carried out through the deposition apparatus 100 described above shall now be described.

Reference shall be made in particular to the deposition of reinforcing elements 5' on a deposition path 7 extending along an annular portion of the toroidal support 60, in the region of the bead of the tyre being processed. Such an annular portion is substantially circular, with centre lying on a rotation axis of the toroidal support 60 and inner radius preferably between about 200 mm and about 350 mm.

In a first step of the process, a piece 5 is cut to size from the continuous band-like element 4 fed by the feeding device 20. Feeding takes place along a feeding direction F substantially parallel to the direction of longitudinal extension G of the continuous band-like element 4. The piece 5 is cut according to a cutting angle α of between about 0° and about 70°, more preferably between about 20° and about 65°, said cutting angle α being defined between the perpendicular to the direction of longitudinal extension G and a cutting direction C.

In a subsequent step, the piece 5 is gripped, through the gripping elements 41, 42 of the gripping device 40, at two opposite sides 5a, 5b thereof parallel to the feeding direction F, in the gripping plane Π (which in FIG. 1 coincides with the plane of representation, whereas in FIG. 3 it is perpendicular to the plane of representation).

The grip is ensured by the penetration of the needles 49 into the material of the piece 5 and preferably occurs in such a way that the row of needles 49 of each gripping element 41, 42 is positioned on the inside with respect to at least the first thread-like reinforcing element adjacent to each of the sides 5a, 5b. Preferably, the grip is achieved in such a way that the needles 49 are at a distance d of between about 1.5 mm and about 2.5 mm from the outer edges of the sides 5a, 5b. Preferably, moreover, the grip takes place in such a way that the pin axes $X_1$, $X_2$ of the gripping elements are at corresponding end areas of the sides 5a, 5b. Such end areas are intended to be deposited at radially inner areas of the deposition path 7.

In a subsequent step of the process, the piece 5 is deformed through rotation of the gripping elements 41, 42 about the pin axes $X_1$, $X_2$ by respective predetermined angles of rotation $\gamma_1$, $\gamma_2$ away from each other. Deformation occurs substantially in the plane in which the piece 5 lies, coinciding with or substantially parallel to the gripping plane Π.

In this way a substantially "fan-shaped" deformation of the piece 5 is achieved, in which the portion of piece transversal to the two sides 5a, 5b that is nearest to the position of the pin axes $X_1$, $X_2$ substantially is not subjected to deformations, whereas the transversal portions farther from the pin axes $X_1$, $X_2$ are subjected to stretchings, wherein the magnitude of this stretchings increases as the distance of these transversal portions from the position of such axes increases (FIG. 1).

In FIGS. 1 and 2 for comparison the shape that the reinforcing elements 5' would assume by depositing non-deformed pieces 5, represented with dotted and dashed lines, along the deposition path 7, is also illustrated. It is clear that, without deformation, between one piece 5 and the adjacent ones empty spaces would remain such as to alter the uniformity of the reinforcing elements 5' forming a reinforcing layer 1.

The extent of the angles of rotation $\gamma_1$, $\gamma_2$, and therefore the extent of the deformation of the piece 5, is determined based upon the curvature of the deposition part on which each piece 5 is intended to be deposited, upon the cutting angle α of the piece 5 (FIG. 1) and upon a deposition angle β of the piece 5 (FIG. 2), the latter being defined as the angle between a radial direction R of the toroidal support 60 passing, at the moment of deposition, through a radially inner point of the piece 5 and belonging to the direction of longitudinal extension G of the piece (5), and the same direction of longitudinal extension G.

Typically, the cutting angle α and the deposition angle β are preset and remain constant during the entire deposition process of the reinforcing layer 1, whereas the curvature of the deposition path can, in general, vary, requiring corresponding variations of the angles of rotation $\gamma_1$, $\gamma_2$ from one piece to the other. In the specific case illustrated here, however, since the deposition path 7 is a circular ring, the curvature is constant and therefore the angles of rotation $\gamma_1$, $\gamma_2$ are the same for all of the pieces 5.

Preferably the angles of rotation $\gamma_1$, $\gamma_2$, are equal to each other, and have a width of between about 1° and about 10°.

In alternative embodiments, it is also possible to foresee that the pieces 5 undergo "asymmetrical" deformations, obtained by rotating just one of the gripping elements 41, 42 whereas the other is or is kept fixed.

The aforementioned deformation step is carried out at the same time as the piece 5 is moved between a first position at the feeding device 20 and a second position at said toroidal support 60.

In a subsequent step of the process, the piece 5 deformed as described above is deposited at the respective deposition part of the deposition path 7. As stated above, the deposition of each piece 5 is carried out according to the deposition angle β, of between about 0° and about 35°, and in such a way that the end areas of the piece 5 at which the pin axes $X_1$, $X_2$ of the gripping elements 41, 42 pass are deposited at radially inner areas of the deposition path 7.

The aforementioned cutting, deformation and deposition steps of pieces 5 are repeated for a predetermined number of times, each time changing the deposition part so as to deposit a plurality of such pieces 5 in side-by-side relationship, so as to cover the entire deposition path 7, thus completing the formation of the reinforcing layer 1.

A step of passing a pressing member on the deposited pieces 5 is also preferably foreseen, so as to ensure that they completely stick to the underlying structures of the tyre being processed. Such a step can be carried out after the deposition of each piece 5 and onto each of them individually, or else at the end of the deposition of all of the pieces 5, onto the entire reinforcing layer 1.

The invention claimed is:

1. A process for manufacturing tires for vehicle wheels, comprising building, on a toroidal support, a carcass structure comprising at least one carcass ply associated, at axially opposite end edges thereof, with annular anchoring structures, the step of building said carcass structure comprising forming at least one reinforcing structure, operatively associated with said annular anchoring structures through deposition on said toroidal support of at least one reinforcing element along a predetermined curvilinear deposition path, the deposition step of said at least one reinforcing element comprising the steps of:

cutting to size a piece of at least one continuous reinforcing band-like element;

deforming said piece of at least one continuous reinforcing band-like element according to a curvature of a deposition part of said deposition path adapted to receive said piece of at least one continuous reinforcing band-like element;

depositing a deformed piece of at least one continuous reinforcing band-like element at said deposition part; and repeating said cutting, deforming and depositing steps for a predetermined number of times, each time changing the deposition part so as to deposit a plurality of pieces of at least one continuous reinforcing band-like element in a side-by-side relationship along said deposition path, wherein, in said cutting to size step, said reinforcing continuous band-like element is fed by a feeding device along a predetermined feeding direction, and wherein said deforming step comprises the steps of: gripping said piece of at least one continuous reinforcing band-like element at two opposite sides thereof which will become arranged side-by-side with contiguously deposited pieces of the reinforcing structure; and rotating at least one side of said piece of at least one continuous reinforcing band-like element by a predetermined angle of rotation away from the other side about a respective pin axis.

2. The process according to claim 1, wherein, in said deforming step, said piece of at least one continuous reinforcing band-like element is deformed substantially in a plane on which it lies.

3. The process according to claim 1, wherein said opposite sides are parallel to said feeding direction.

4. The process according to claim 1, wherein said gripping step is carried out in such a way that said pin axis is arranged at an end area of said at least one side.

5. The process according to claim 4, wherein said end area is adapted to be deposited at a radially inner end area of said deposition part.

6. The process according to claim 1, wherein said predetermined angle of rotation is about 1° to about 10°.

7. The process according to claim 1, wherein said rotating step comprises the step of:

rotating both of said opposite sides of said piece of at least one continuous reinforcing band-like element by respective predetermined angles of rotation away from each other about respective pin axes.

8. The process according to claim 7, wherein said gripping step is carried out in such a way that said pin axes are arranged at respective end areas of said opposite sides.

9. The process according to claim 8 wherein said end areas are adapted to be deposited at respective radially inner end areas of said deposition part.

10. The process according to claim 7, wherein said respective predetermined angles of rotation are equal to each other.

11. The process according to claim 10, wherein said respective predetermined angles of rotation are about 1° to about 10°.

12. The process according to claim 1, wherein said deposition path extends along an annular portion of said toroidal support having a substantially circular shape and a centre lying on a rotation axis of said toroidal support, said piece of at least one continuous reinforcing band-like element being deformed according to a radius of said annular portion.

13. The process according to claim 12, wherein said annular portion has an inner radius of about 200 mm to about 350 mm.

14. The process according to claim 1, wherein the depositing step of said at least one reinforcing element further comprises the step of:

moving said piece of at least one continuous reinforcing band-like element between a first position at said feeding device and a second position at said toroidal support.

15. The process according to claim 14, wherein said deforming step is carried out during said moving step.

16. The process according to claim 1, wherein the cutting, deforming and depositing steps are repeated for a number of times at least sufficient to cover substantially the entire deposition path through a plurality of said pieces of at least one continuous reinforcing band-like element.

17. The process according to claim 1, further comprising the step of:

passing a pressing member on one or more deposited pieces of at least one continuous reinforcing band-like element.

18. The process according to claim 1, wherein said at least one reinforcing continuous band-like element has a width of about 10 mm to about 50 mm.

19. The process according to claim 1, wherein said at least one reinforcing continuous band-like element comprises at least one thread-like reinforcing element incorporated in an elastomeric material.

20. The process according to claim 1, wherein, in said cutting step, said piece of at least one continuous reinforcing band-like element is cut according to a cutting angle of about 0° to about 70°.

21. The process according to claim 20, wherein said cutting angle is about 20° to about 65°.

22. The process according to claim 1, wherein, in said depositing step, said piece of at least one continuous reinforcing band-like element is deposited at said deposition part along a direction forming a predetermined deposition angle defined between a radial direction of the toroidal support passing, at a moment of deposition, through a radially inner point of the piece of at least one continuous reinforcing band-like element, and a direction of longitudinal extension of the piece.

23. The process according to claim 22, wherein said deposition angle is about 0° to about 35°.

24. The process according to claim 22, wherein, in said deforming step, deformation of said piece of at least one continuous reinforcing band-like element is carried out according to said deposition angle.

25. The process according to claim 20, wherein, in said deforming step, deformation of said piece of at least one continuous reinforcing band-like element is carried out according to said cutting angle.

26. The process according to claim 1, wherein each reinforcing element comprises at least one thread-like reinforcing element oriented at the end of said depositing step so as to form an angle, with the radial direction passing through the radially inner end thereof, having a width greater than or equal to 0° and lower than 90°.

* * * * *